United States Patent [19]
Garcia

[11] 4,446,588
[45] May 8, 1984

[54] MULTI-PURPOSE TOOL

[76] Inventor: Richard J. Garcia, 304 Plum Dr., Exeter, Calif. 93221

[21] Appl. No.: 381,545

[22] Filed: May 24, 1982

[51] Int. Cl.³ .................... B23Q 11/00; B25F 1/00
[52] U.S. Cl. ............................................ 7/138; 7/143; 279/1 K; 408/710; 409/233
[58] Field of Search ............... 408/710, 3, 4; 409/233; 279/1 K; 7/138, 143

[56] References Cited
U.S. PATENT DOCUMENTS 3,769,473 10/1973 Lay ................................. 408/710 X
3,950,625 4/1976 Klebe, Jr. et al. ............. 408/710 X Primary Examiner—Z. R. Bilinsky
Attorney, Agent, or Firm—Dennis B. Haase

[57] ABSTRACT

The present invention relates to a multi-purpose tool having particular, although not exclusive, use in conjunction with milling machines in which a drawbar is employed to engage and disengage a tool collet wherein the drawbar protrudes above the machine tool and is rotatable to release and secure the collet. The tool of the present invention combines a socket wrench for rotating the drawbar and a mallet for tapping the bar to free up the collet taper. The tool is dynamically balanced about the axis of the center of mass which is fitted to the protruding end of the drawbar. A handle is provided which is extendable to increase the torque or leverage available to the user and the handle itself is weighted to take advantage of centrifugal force to urge the handle towards its retracted position. A beveled pin or wedge device is also provided to inhibit the lowering of the drawbar with the tool still engaged with the protruding end. Finally, a safety cut off switch is provided in conjunction with the tool holder which is selectively actuated to preclude operation of the machine with the tool elsewhere than in the tool holder.

9 Claims, 8 Drawing Figures

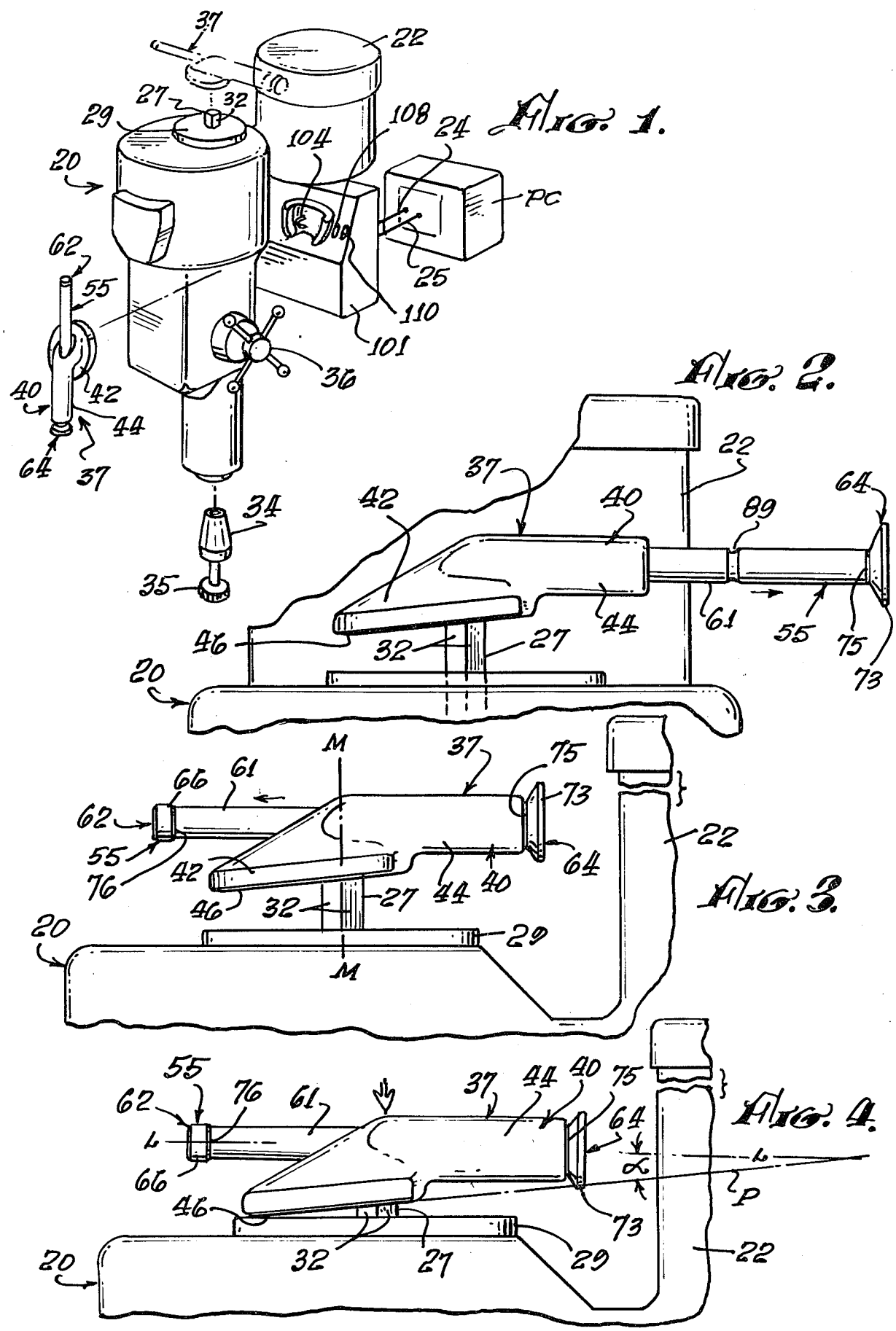

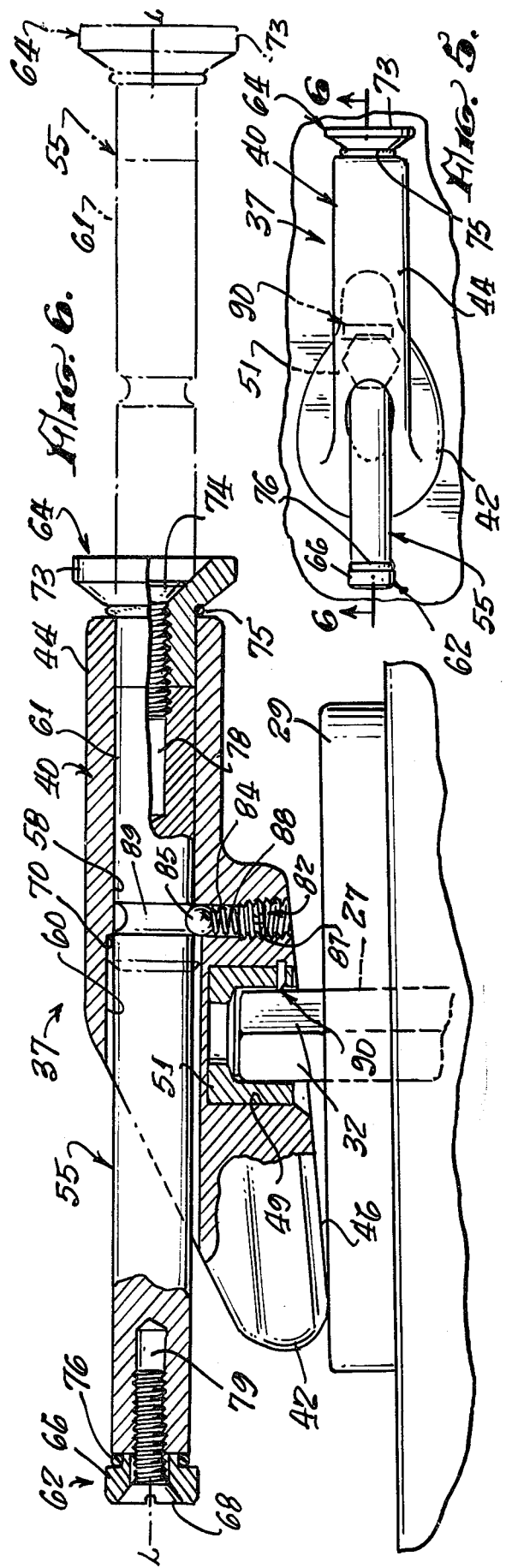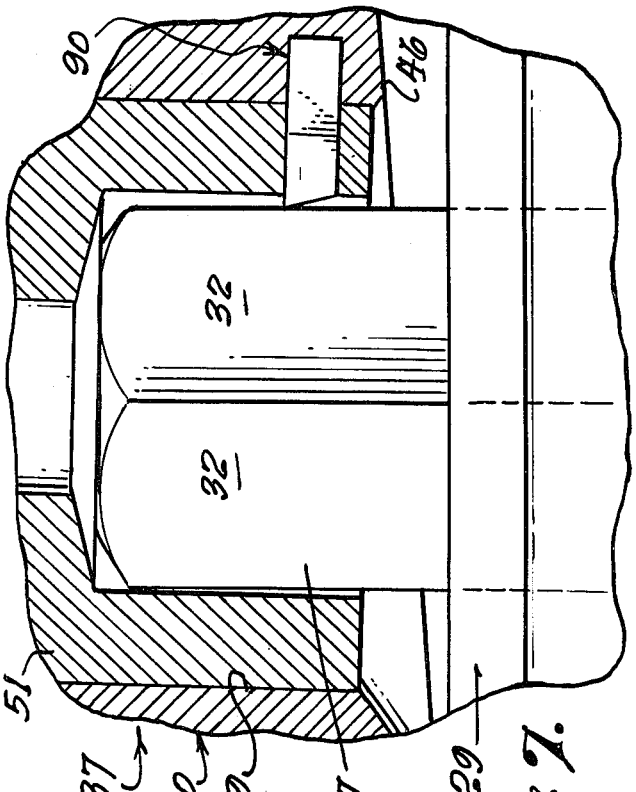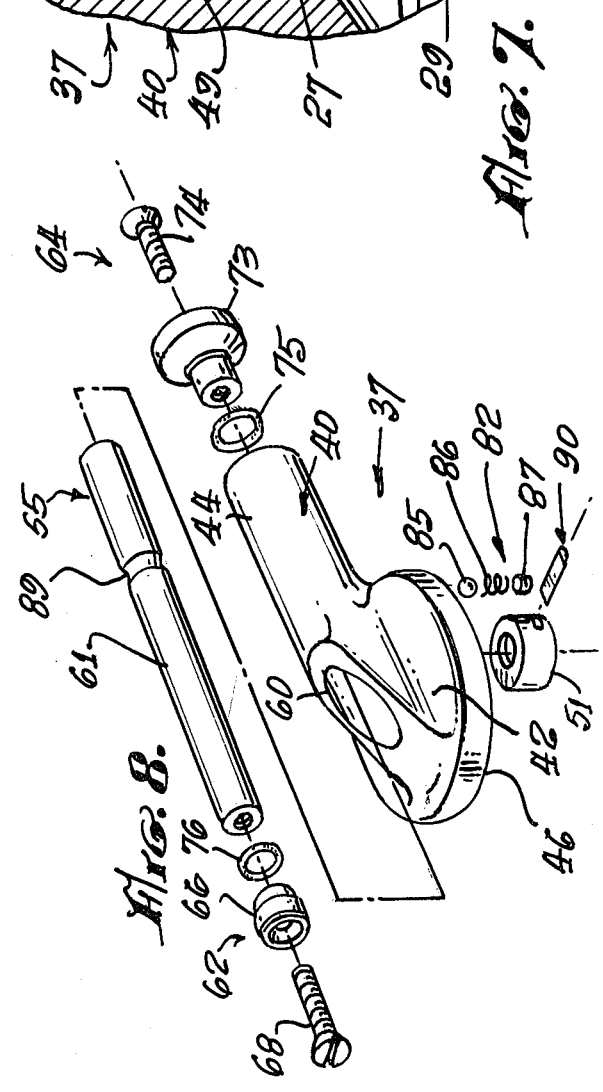

MULTI-PURPOSE TOOL

BACKGROUND OF THE INVENTION

1. Field of the Invention

Virtually since the first vertical mill became actively used, operators have displayed a remarkable proclivity for hurting themselves and others by leaving a wrench over the top of the drawbar used in such machines.

The drawbar, with one end protruding above a bearing cap, passes down through the machine where it engages a tapered collet which holds the working tool. In order to change tools, the drawbar is rotated to free the collet and then tapped on the top to break the surface tension and free the tool within the collet. The first operation is typically done with a closed end, box end, wrench, or socket wrench, and then a hammer or other implement is used to tap down the drawbar. Previous methods have a myriad of faults, as well as dangers, the most common of which is the leaving of the wrench engaged with the drawbar when the mill is started. In a typical installation, the length of the wrench exceeds the distance between the center of the drawbar and an adjacent motor and as the motor is started, the drawbar rotates, whipping the wrench around against the side of the motor housing with a possible resultant damage to the drawbar, but with the more likely result of the wrench flying off at high speed and with considerable force, to the obvious detriment of anything or anyone which is in its way. The problem is amplified somewhat by the constant pounding of the top of the drawbar with some hammer or mallet-type instrument. An eventual deformation results and that deformation causes a misfit between the wrench and the drawbar. That misfit makes it even easier for the wrench to fly off if the machine is inadvertently started, but may also result in a rounding of the edges of the typically hexagonal or octagonal shaped drawbar end, meaning an eventual costly replacement. If anything is left on the drawbar when the machine is started, tremendous centrifugal forces will be imparted to it and if it flies off under any circumstances, it becomes exceeedingly dangerous.

The present invention provides the operator of such a machine with a specially designed and highly innovative tool which serves both as a socket wrench and as a mallet for tapping the top of the drawbar. As will be described in detail, the tool is so designed as to greatly decrease the danger to persons and property around the machine if the tool is inadvertently left in mating engagement with the drawbar. It is also designed to greatly inhibit any downward movement of the drawbar with the tool in place on the exposed end thereof, thereby minimizing the danger of the tool flying off under such circumstances.

The invention in a further aspect provides a remote tool holder which may be sensitized to actuate a power cut off switch whereby the machine is rendered inoperative except when the tool is in its proper place, i.e., the tool holder, during operation of the machine. This aspect of the invention contemplates the use of a tool operated switch disposed between a power source and the mill motor which, in its normally open position, deprives the machine tool of power. When the tool is placed in a remote holder, however, the switch is automatically closed permitting the machine to be operated. This facet of the invention insures that the operator of the machine has removed the tool and properly stored it before the machine can be operated.

2. Description of the Prior Art

Until the advent of the present invention, operators of the machines of this type have typically used two tools, namely a wrench for rotating the drawbar and a mallet for tapping it to free the collet. There does exist a combination wrench-hammer currently sold by SPI in which a standard mallet construction includes a socket wrench on the hammer head opposite the striking surface. That device has none of the unique features of the present invention.

BRIEF DESCRIPTION OF THE DRAWINGS

The drawings, comprising 8 figures, illustrate various embodiments of the invention in a typical environment. More particularly, there is illustrated:

FIG. 1 is an exploded perspective of a tool constructed in accordance with the present invention and a typical milling machine for which it has particular, but not exclusive utility;

FIGS. 2 and 3 are side elevations of the tool in position on the drawbar of the machine, showing the extended and retracted positions of the handle of the tool;

FIG. 4 is a side elevation illustrating the action of the tool relative to the machine as the drawbar is urged downwardly;

FIG. 5 is a top view of the tool at rest on a drawbar;

FIG. 6 is a partial section of the tool along lines 6—6 in FIG. 5;

FIG. 7 is an enlarged partial section showing the interaction of the tool and drawbar as the drawbar is moved downwardly; and FIG. 8 is an exploded perspective of the tool itself illustrating the various elements of its construction.

DESCRIPTION OF A PREFERRED EMBODIMENT

With reference now to the drawings, and more particularly to FIG. 1, a multi-purpose combination tool constructed in accordance with the present invention is illustrated in perspective and in conjunction with a machine of the type for which the tool was created.

In order to fully appreciate the innovations which this tool brings to the user, it is first important to have an understanding of the type of machine for which it finds its principal, although not exclusive, application. At 20, therefore, there is illustrated by way of demonstrating the invention, a vertical milling machine of the type manufactured by Bridgeport Manufacturing Company. Those elements of the machine which are germane to the understanding of this specification include an electric motor 22 (although it will be appreciated that any suitable type of motive power may be used) connected to a suitable power source PC by power lines 24 and 25, which drives a drawbar assembly, portions of which are shown and described below. The drawbar assembly is driven by the motor through an appropriate speed governing transmission. With the transmission in neutral, however, the drawbar is manually rotatable and, for that purpose, has a portion of its upper end 27 exposed and protruding beyond the upper bearing cap 29 of the transmission casing 30. The upper end of the drawbar has a series of longitudinal flats 32 which extend axially off the drawbar about its periphery providing typically an octagonal or hexagonal cross-section of a standard size. The drawbar functions to selectively secure and release a tool collet 34 having tapered sides which are compressed as the drawbar is rotated in one direction to grasp a cutting tool 35 such as a mill cutter and to release the tool when the drawbar is rotated in the opposite direction. Because of surface tension and other factors which build up between the elements of the collet in compression, it is typically necessary to give the top of the drawbar a rap to free up the collet.

With the tool in place and the machine ready to work, the drawbar, collet and tool are moved by means of rotation of a spider handle 36 as a unit towards and away from the work piece, and in so doing, the extension or end portion 27 of the drawbar moves with the tool and may, depending upon construction, not protrude at all at its lower extent of travel.

It is one objective of the present invention to combine, in a useful package, a combination socket wrench and mallet capable of performing all of the manual maneuvers required to change a tool in a drawbar type machine as previously described. This has been accomplished, in accordance with the present invention, by the provision of a multi-purpose tool assembly 37 (see particularly FIGS. 6 and 8) having elongated unitary body 40. The body is readily susceptible of being cast and may be of a zinc or aluminum alloy or some other appropriate material. It will be appreciated that the material should be somewhat softer than the drawbar material in order that the drawbar end 27 will not be damaged or deformed by repeated taps with the tool. The body 40 is formed with a relatively broad protuberant portion 42 and a grip portion 44 formed at a position above and extending longitudinally away from the protuberant portion 42.

A flattened surface 46 may be cast or machined or otherwise formed on an outer surface of the protuberant portion 42 remote from the grip. This surface, as will be seen, will serve as a mallet for striking the top of the drawbar assembly. The flat surface 46 is formed with a recess 49 for the specific purpose of receiving a receptacle such as hardened steel sock 51, flush with the flat 46 and dimensional to be received on the upper end 27 of the drawbar in mating engagement for rotating the drawbar about its vertical axis.

The socket 51 is permanently fitted in the recess 49 by any appropriate means and is disposed, in accordance with another aspect of the invention, along the axis M—M as seen in FIG. 3, which is the axis of the center of mass of the tool as fully assembled. It is a feature of the invention that the tool assembly 37 is dynamically balanced about the axis M—M so as to minimize vibration and pulsation which would tend to throw the tool off of the end of the drawbar should it be there present when the drawbar is rotating.

In tightening or releasing the collet considerable leverage may be required to rotate the tool 37. In machines of the type illustrated, however, there is a very limited space within which this effort can be applied due to the close proximity of the motor drive 22 to the upper end of the drawbar 27, as shown in FIG. 3. In order, therefore, to permit the operator of the machine to exert sufficient leverage on the tool to rotate the drawbar, there is provided, in accordance with a further aspect of the invention, an extensible and retractable handle 55 (seen best in FIGS. 2 and 3). In order to accommodate and house the handle, the grip portion 44 of the tool 37 is bored out as at 58 and concentrically counter-bored as at 60, along the longitudinal axis L—L of the grip, thereby forming a shoulder.

The handle 55 slides within the bore and counter bore 58 and 60 as illustrated best in FIG. 6. The handle itself may be of any suitable material without departure from the invention. Once situated within the bore, however, it is desirable that the handle not be removed inadvertently. Since a contemplated abuse of the tool is that it will be forgotten and inadvertently left in mating engagement with the drawbar when the motor is started, thereby causing it to rotate at high speed, it is within the contemplation of the invention that the handle 55 be provided with stop members at either end of the handle barrel 61 to prevent inadvertent removal manually or by rotation at high speed. For purposes of illustration, the handle may be described as having a retracted or retracting end, i.e., the end which at all times would remain closest to the center of rotation of the tool and the extended end which, quite apparently, would be the end most remote from the tool when the handle is extended. The retracted end is shown at 62 with the extended end illustrated at 64. At the retracted end there is a stop member 66 which is held by any suitable means such as machine screw 68. The diameter of the stop member 66 is greater than the bore 58 but smaller than counter bore 60, and when the tool is in position and the handle is in its extended position as illustrated in FIG. 2, the stop member abuts the bore at abutment 70 formed at the terminus of the counter bore with the bore thereby limiting further extension of the handle. At the extended end there is likewise a stop member 73 and in the illustrated case, the stop member is significantly larger than that shown at 66 and is flared out or tapered in order to accommodate the fingers of the operator who will use the stop member to pull the handle to its extended position. The stop member in the handle retracted (FIG. 3) position likewise abuts the end of the grip portion 44 of the tool to limit further retraction of the handle. The "O" rings 75 and 76, respectively, may be used between the stop members and the handle to dampen shock occasioned by rapid extension or retraction of the handle.

With the handle extended, of course, significant additional leverage may be placed on the drawbar to cause its rotation.

In accordance with still another feature of the invention, the handle is weighted by use of the stop members and by the depth of the bore and taps in each end with the result that the greater weight will always appear at the retracted end. Specifically, as may be seen in FIG. 6, the depth of bore extended 78 is greater than the depth of bore retracted 79. As a consequence of this weight imbalance, and again contemplating the misuse of the tool, rotation of the tool will apply a longitudinal centripetal force on the handle causing it to be urged towards the retracted position. This avoids the likelihood of the handle flying outwardly upon rapid rotation and slamming against the electric motor drive casing, the consequences of which are evident.

As best seen in FIGS. 7 and 8, and by way of further inhibition against inadvertent extension of the handle 55, a ball detent assembly indicated generally at 82 is shown as being mounted in a transverse tapped bore 84. A hardened ball 85 is pressured by means of spring 86 against the longitudinal circumference of the handle. A set screw 87 holds the assembly in place. The handle is grooved as at 89 about its circumference and when the handle is in the full retracted position, the ball fits in the groove to inhibit inadvertent extension.

Still another problem arises when even a balanced tool assembly remains on the spinning drawbar. That occurs when the operator, as he inevitably will, advances the rotating drawbar downward toward the workpiece, clearly, such movement would result eventually in the tool being thrown off the drawbar. However, in order to minimize this danger, there is provided, in accordance with another aspect of the invention, a bite bar arrangement 90, as best illustrated in FIG. 7, having as its purpose the wedging of the tool onto the drawbar to inhibit further downward movement in the event that there was an attempted draw down as described. This is accomplished by means of a pin 91 which is mounted transverse to the axis of the socket and one end of which, 92, is secured in the unitary body 40. The pin passes through the wall of the socket protruding into the space which would be occupied by the end of the drawbar. The free end of the pin is beveled upwardly to a point as at 93. As will be seen in FIG. 4, the longitudinal axis of the handle forms an acute angle alpha ($\alpha$) with the plane P extended of the flattened surface 46. As a result of this geometric arrangement, as the drawbar is lowered, the tip 95 of the flat will contact the top of the transmission casing 29 first causing a clockwise tipping action of the tool about the end of the drawbar. This tipping action causes the point 93 to bite into the drawbar thereby inhibiting, if not stopping, the further lowering thereof, or at a minimum, causing sufficient tension to warn the operator of the presence of the tool in order that he might stop what he is doing and remove it.

A further embodiment of the invention is best illustrated in FIG. 1. In these figures, a tool holder 100 is mounted on a master control box 101 in working proximity to the machine but in a location in which it is discreet and remote from the upper end 27 of the drawbar. The tool holder comprises a pair of brackets 102 which may be unitary or discreet. The brackets are adapted to receive and hold the tool in a conveniently accessible, but noninterfering position. Mounted between the brackets and in close proximity to the contemplated position of the tool at rest in the brackets is a switch 104. The switch is wired into the power line 24 from the power source PC to the machine motor 22, and in a normally open position it interrupts power to the motor, thereby preventing the machine from being used. When the tool is placed in the brackets, however, the switch is depressed by the tool to a closed position thereby completing the circuit to permit the machine to be operated by depression of the power switch 102. Thus, the machine may be rendered inoperative except when the tool is in its proper position in its tool holder. A second switch is provided at 104 to connect power from the power source PC to an accessory not shown.

Having thus illustrated and described a highly useful and versatile multi-purpose tool having numerous unique safety features which render it safe in use, I now claim as my invention:

1. For use in changing a tool in a machine having a drawbar for holding a tool in a collet, which drawbar has an end protruding from said machine and is rotatable to release and secure the collet relative to said drawbar; a combination tool comprising an elongated unitary body, said body being formed with a broad protuberant portion;

a grip portion formed above said protuberant portion and extending longitudinally of said body;

means defining an axial bore extending through said grip portion;

a handle slidably disposed in said bore between a handle extended position and a handle retracted position;

a flat surface being formed on an extremity of said protuberant portion remote from said grip portion;

means defining a recess extending inwardly from said flat surface;

a receptacle disposed in said recess and affixed therein; said receptacle conforming to the exterior shape of the drawbar and adapted to fit in mating engagement over the protruding end thereof to rotate the same upon rotation of said tool;

and said flat surface defining with said protuberant portion, a mallet for striking the top of said drawbar to thereby free the collet.

2. A tool as set forth in claim 1 where said axial bore includes a concentric counter-bore to form and abuttment therein with said bore;

means defining stops affixed at each end of said handle, one of said stop members being adapted to engage said abuttment to define the limit of the handle extended position of said handle.

3. A tool as set forth in claim 2 wherein the other of said stops being adapted to abut the end of said grip portion of said unitary body to define the limit of the handle retracted position.

4. A tool as set forth in claim 1 wherein said unitary body having a spring loaded ball projecting into said bore;

a groove formed about the circumference of said handle;

said ball aligned with and adapted to engage said groove in the handle retracted position to inhibit movement of said handle to its extended position.

5. A tool as set forth in claim 1, wherein the axis of said receptacle is coincident with the axis of the center of mass of said tool and said tool is dynamically balanced about said axis.

6. A tool as set forth in claim 5 wherein said handle assembly is weighted so as to urge said handle towards the handle retracted position upon rotation of said tool about said axis.

7. A tool as set forth in claim 1 wherein bite bar means is provided in said receptacle for inhibiting disengagement of said tool with the end of the drawbar upon downward movement thereof.

8. A tool as set forth in claim 7, wherein grid bite bar means includes means defining a pin, said pin having an end thereof affixed in said body; the other end of said pin projecting through said socket so as to engage the surface of the end of the drawbar with the tool placed thereon; said other end being beveled to define a point; said point being so positioned to resist inadvertent withdrawal of said drawbar from said socket.

9. A tool as set forth in claim 7, wherein said flat surface is disposed in a plane which forms an acute angle with the axis of said handle so as to tip said combination tool upon engagement with said machine to thereby cause said point to bite into said drawbar to thereby resist further movement thereof.

* * * * *